Oct. 4, 1955 J. C. WEST 2,719,940

SWITCHING SYSTEM FOR DUAL SPEED SERVOMECHANISM

Filed Dec. 1, 1952

INVENTOR
JOHN C WEST
BY Stevens, Davis, Miller and Mosher
ATTORNEYS

United States Patent Office 2,719,940

Patented Oct. 4, 1955

2,719,940

SWITCHING SYSTEM FOR DUAL SPEED SERVOMECHANISM

John C. West, Hindley, England, assignor to National Research Development Corporation, London, England, a British corporation Application December 1, 1952, Serial No. 323,358

Claims priority, application Great Britain December 4, 1951

2 Claims. (Cl. 318—30)

Figure 1:
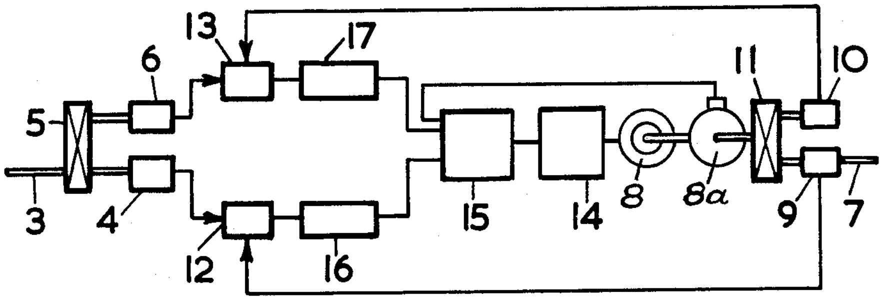

The present invention relates to position-control servo systems, and is concerned in particular with systems in which both coarse and fine controls are provided. Such systems have been variously described as "coarse-fine," "two-speed" and "two-channel."

In a coarse-fine servo system designed to provide accurate positioning over a wide range, it is usual to provide a coarse channel arranged to measure positional error over the whole of the desired range, and a fine channel designed to operate with a required higher accuracy over a relatively limited range.

In the operation of such servo mechanisms, the function of the coarse control means is to bring the error within the range of the fine channel, and switching means are provided, operating in dependence upon the magnitude of the coarse error signal, to transfer control from the coarse control means to the fine control means when the coarse error signal falls below some predetermined level. The time of response of such a system is made up of a first part, extending in time from an initial input demand to the instant when the coarse error signal reaches the change-over value, a second part, corresponding to the time taken for the change-over switching means to operate (during which part the response is still that of the coarse channel) and a final part during which the fine control means are in control.

Apart from the fact that reliance on switching means introduces undesirable complexities and makes the overall response time excessively long, such known systems have the disadvantage that both the fine and coarse control means must be stabilised separately, or, if the system is stabilised for the more critical channel (the fine channel) the coarse channel will operate sluggishly.

It is an object of this invention to provide improved position-control servo systems, and a more particular object is to remove the disadvantages referred to of known systems.

The invention, broadly stated, consists in utilising both coarse and fine error signals simultaneously, means being provided for ensuring freedom from false operation without substantially reducing the overall accuracy of the system.

It will be understood that the fine error signal normally takes the form of an oscillation whose frequency decreases as the final position is approached. Both the coarse error signal and the fine error signal become asymptotic towards zero, and this condition indicates that the correct position has been reached. In order to ensure maximum accuracy, consistent with stability, both fine and coarse error signals are arranged to have the same or nearly the same amplitude. It follows that if the two signals are merely combined and fed simultaneously to the servo-motor, spurious steady states will occur whenever the combined signal has the value zero.

According to the invention, the aforesaid means comprises an integrating circuit which is fed with the fine error signal and whose time constant is such that its output only becomes comparable with the value of the coarse error signal as the system approaches the steady state, the output of the integrator is added algebraically to the coarse error signal, and the resulting signal is used to control the servo-motor, the amplitude of the said output being such that the said resulting signal does not reach zero until after the final half-cycle of the fine error signal has commenced.

Other features of the invention will appear from the following description of an embodiment of the invention, in which reference will be made to the accompanying drawings. In the drawings, Figure 1 is a block diagram of an arrangement according to the invention, and Figure 2 illustrates in more detail a form of integrator suitable for use in an arrangement such as that of Figure 1.

Referring to the drawing, an input shaft 3 (Fig. 1) drives directly a coarse position-measuring device 4, and, through gearing 5, a faster-moving fine-position measuring device 6. A servo-motor 8 drives tachometer generator 8*a* and a coarse position-measuring device 9 directly coupled to the output shaft 7, and the fine position-measuring device 10 is driven by the motor 8 through gearing 11. A coarse error signal is derived by the device shown diagrammatically at 12, which interprets signals from the coarse position-measuring devices 4 and 9, and a similar device 13 is shown connected to the fine position-measuring devices 6 and 10 to provide a fine error signal. The position-measuring devices conveniently take the form of synchros.

The servo-motor 8 is controlled by the output of an amplifier 14 deriving its input from the device 15 which is fed independently with inputs derived respectively from the fine and coarse channels. Means such as a conventional phase-advance network are shown at 16 for stabilising the coarse channel, and the fine error signal from device 13 is applied to the device 15 through an integrator 17.

Figure 2:
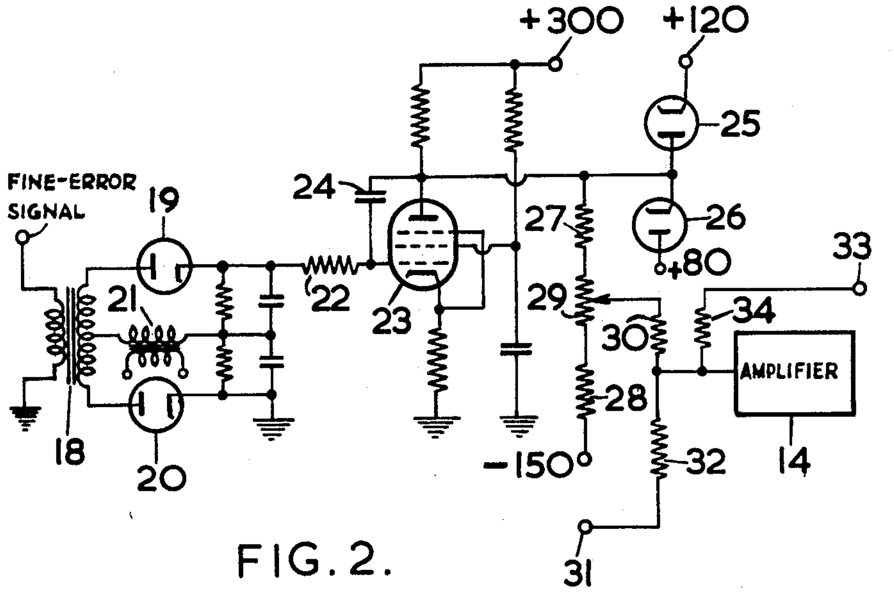

It will be seen that the arrangement of Figure 1 is a conventional servo system to which the elements 5, 6, 10, 11, 13 and 17 of the fine channel have been added. It can be shown that in the system of Figure 1 the error, which tends to zero as the final steady state is approached, is given approximately by $$\frac{B}{N}+\frac{D}{NSG_f}$$

where B represents the inherent inaccuracies of the position measuring devices, N is the ratio of the gear trains by which the fine position-measuring devices are coupled to the input and output shafts, D represents the extraneous loading on the system, S is the steady state gain of the integrator, and $G_f$ is the gain of the fine channel.

It will be seen that inaccuracies due to the position measuring devices are reduced by the gear ratio N, and the disturbance effect of extraneous loading is reduced by the overall fine gain $NSG_f$.

Reference is now directed to Figure 2, which illustrates an integrator suitable for use in a system such as that of Fig. 1. Fine error signals in the form of a modulation of a reference oscillation are generated by the synchro position-measuring devices 6 and 10 and are fed through a transformer 18 to a phase-sensitive rectifier, which comprises the two diodes 19, 20, and has the reference oscillation applied to it by means of transformer 21. The resulting fine error signal is applied through a resistor 22 to the control grid of a pentode 23, having a capacitance 24 connected between its anode and control grid. The magnitudes of the elements 22, 24, are chosen to ensure that the integrator has an appropriate desired time constant. The anode of valve 23 is also connected to the anode of a diode 25 and the cathode of a diode 26, the cathode of diode 25 and the anode of diode 26 being connected to points at +120 and +80 volts respectively, so that excursions of the voltage at the anode of pentode 23 are confined within these limits.

The output of pentode 23 is applied to one end of a potential divider comprising the equal resistors 27, 28, and the adjustable potential divider 29. The slider of resistor 29 is adjusted so that its mean potential is approximately that of earth, and the resistor values are such that the potential at the slider may move, with variations in the fine error signal, through ±10 volts only about earth. The slider is connected through a resistor 30 to the input of the servo-motor amplifier 14, and the coarse error signal derived from a phase-sensitive rectifier similar to that described above is applied to the same input point from terminal 31 through a resistor 32. Also applied to the same input point, through a resistor 34, is a stabilising signal in the form of a direct velocity feedback component from the D. C. tachometer generator 8*a*. The stabilising signal is applied to terminal 33.

The time constant of the integrator is so adjusted that fine error signals only become comparable with the value of the coarse error signal as the system approaches the steady state. The output of the integrator is limited by means of the diodes 25 and 26 so that the signal fed to the amplifier 14, which is the algebraic sum of the coarse error signal and the integrator output, does not reach zero until after the final half-cycle of the fine error signal has commenced.

The stability of the system is that of the coarse channel, and the latter can be designed with regard to stability but without regard to accuracy, for the fine channel, which is designed to provide the required degree of accuracy, does not affect the overall stability of the system.

I claim:

1. A coarse-fine position-control servo system comprising a servo-motor, means for deriving a coarse error signal, signal combining means, means for applying the output of said signal combining means as a control signal for said servo-motor, whereby said servo-motor is driven at a speed related to the magnitude of said output, means for deriving a fine error signal which fluctuates through zero at a frequency related to the speed of said servo-motor, an integrator connected to receive said fine error signal, said integrator having a time constant such that its output signal is small for high frequencies of fluctuation of said fine error signal, said output signal increasing as the frequency of fluctuation of said fine error signal falls when the speed of the servo-motor falls as the system approaches the steady state, and means for applying the output signal from said integrator to said signal combining means, the amplitude of the integrator output signal being such that the algebraic sum of the coarse error signal and the integrator output signal does not reach zero until after the final half-cycle of the fine error signal has commenced.

2. A system as claimed in claim 1 comprising means for adjusting the amplitude of the signal supplied from said integrator to said signal combining means.

References Cited in the file of this patent

UNITED STATES PATENTS

| | | |
|---|---|---|
| 2,521,904 | Doak | Sept. 12, 1950 |
| 2,620,441 | McCoy et al. | Dec. 2, 1952 |